United States Patent [19]
Sullivan et al.

[11] Patent Number: 5,275,639
[45] Date of Patent: Jan. 4, 1994

[54] RECOVERY OF PHOSPHATES FROM ELEMENTAL PHOSPHORUS BEARING WASTES

[75] Inventors: Jack M. Sullivan, Florence; Raymond D. Thrasher, Killen; Ronald E. Edwards, Florence, all of Ala.

[73] Assignee: Tennessee Valley Authority, Muscle Shoals, Ala.

[21] Appl. No.: 28,877

[22] Filed: Mar. 10, 1993

[51] Int. Cl.$^5$ ............................................. C05B 11/04
[52] U.S. Cl. ............................................. 71/37; 71/34; 71/40; 71/61; 423/317; 423/394
[58] Field of Search .................... 423/394, 317; 71/34, 71/37, 40, 61

[56] References Cited

U.S. PATENT DOCUMENTS

| | | | |
|---|---|---|---|
| 2,925,326 | 2/1960 | Pieper et al. | 423/317 |
| 4,028,087 | 6/1977 | Schultz et al. | 71/37 |
| 4,177,053 | 12/1979 | Kurandt | 71/40 |
| 4,478,633 | 10/1984 | Chernogorenko et al. | 71/37 |
| 4,649,035 | 3/1987 | Barber | 423/317 |

FOREIGN PATENT DOCUMENTS 971830  11/1982  U.S.S.R. ............................ 71/37

Primary Examiner—Wayne Langel
Attorney, Agent, or Firm—Robert A. Petrusek

[57] ABSTRACT

A process for oxidizing aqueous elemental phosphorus containing residues (sludges) to produce orthophosphate containing slurries suitable for subsequent reaction with ammonia to produce nitrogen- and phosphorus-containing fertilizer products. It comprises reacting aqueous elemental phosphorus containing residues with certain special mixtures of concentrated nitric acid and sulfuric acid to effect the conversion of the elemental phosphorus content of the residues into mostly orthophosphoric acid and very little orthophosphorous acid with the relative ratios of orthophosphoric acid to orthophosphorous acid produced being dependent upon the weight ratio $H_2SO_4:HNO_3$ employed in the processing. The reaction is conducted at the boiling point of the resulting aqueous reaction medium. Prior to the conversion to fertilizer products, the aqueous reaction product intermediate may be subjected to a solids separation step to remove insoluble salts of certain environmentally undesirable metals, such as, Pb, Cd, Ba, and Cr which are derived from phosphate rock via the dust component of phosphorus sludge.

16 Claims, 3 Drawing Sheets

RECOVERY OF PHOSPHATES FROM ELEMENTAL PHOSPHORUS BEARING WASTES

The invention herein described may be manufactured and used by or for the Government for governmental purposes without the payment to us of any royalty therefor.

INTRODUCTION

In the electric furnace process for producing elemental phosphorus, agglomerated phosphate rock is reacted with coke at temperatures usually in the range of from about 2,200° F. to about 2,700° F. Silica is added to the reaction mixture to serve as a flux to remove congeneric calcium as calcium silicate-fluoride slag. An approximate representation of the overall process is shown by the following equation wherein, for convenience, phosphate rock is depicted as fluorapatite.

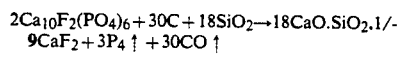

The resulting gaseous elemental phosphorus product, by-product carbon monoxide, and impurities (generally $SiF_4$ and dust) are passed to an electrostatic precipitator where a large portion of the dust is removed at temperatures above the dew point of phosphorus. The gaseous phosphorus and carbon monoxide then flow to condensing columns wherein the phosphorus is condensed to a liquid by water sprays which are generally maintained in the range of from about 113° F. to about 131° F. The pyrophoric liquid phosphorus (melting point 111.4° F.) recovered therefrom is covered with a blanket of warm water to prevent spontaneous combustion. The uncondensed carbon monoxide exits the sprayers and may be burned as a fuel.

The water-covered liquid phosphorus flows to a sump wherein a sludge collects at the interface between the water and the liquid phosphorus. This sludge consists primarily of hydrated silica, fluorosilicates, dust, carbonaceous material, and emulsified phosphorus. A portion of the phosphorus which is entrained in the sludge may be recovered therefrom by means utilizing centrifugation or filtration and a limited quantity of the resulting residue may be recycled to the electric furnace from which the phosphorus values have been won. Unfortunately, the physical and chemical properties of such residue prevent its complete recycle and the remaining portion thereof, which cannot be so recycled, must be treated as a waste or processed by some other means.

In past practice, phosphorus producers often stored such by-product sludges in ponds, sumps, or tanks for future processing. Due to certain environmental considerations associated with the chemical properties or characteristics of elemental phosphorus (Kirk-Othmer, *Encyclopedia of Chemical Technology*, Third Edition, Vol. 17, John Wiley and Sons, New York, pp. 485–486, 1982), such practices are now discouraged and methods for the complete recovery, or conversion of the elemental phosphorus values in such sludges to benign and useful products, are needed. Accordingly, the present invention relates to the complete conversion of such phosphorus sludges to much less toxic oxidized intermediates which can easily and economically be further processed to fertilizer materials.

BACKGROUND OF THE INVENTION

1. Field of the Invention

More stringent environmental regulations have forced manufacturers of elemental phosphorus to seek alternate methods for dealing with the phosphorus sludge problem. Accordingly, past practices which included the storage of sludge in settling ponds and sumps may no longer be considered viable. Likewise, storage in metal tanks can only be considered as a temporary measure. Although elemental phosphorus is only very slightly soluble in water and accordingly is considered to leach at a very slow rate, efforts need to be made to prevent its entrance into ground water and aquifers.

Although elemental phosphorus itself is pyrophoric and highly toxic, the more oxidized inorganic salts of phosphorus are generally much less hazardous. In fact, phosphorus in the form of orthophosphate ($PO_4$) is required for all earthly life forms and is employed in huge quantities as fertilizer and animal food supplement. The present invention provides a technically efficient and economically viable means for the conversion of such elemental phosphorus containing sludges into certain feedstock eminently suitable for later preparation of plant food material.

2. Description of the Prior Art

The conversion of elemental phosphorus containing waste-waters and sludges into fertilizer products has been proposed by Barber et al. (James C. Barber, Charles B. Hendrix, and David Mussleman, *Chemtech*, May, 1986, pp. 298-302). U.S. Pat. No. 4,383,847, Barber, May 17, 1983, teaches that clarified and centrifuged waste-water from phosphorus condensers be used in conjunction with phosphoric acid and ammonia for the production of suspension fertilizers. However, Barber's teachings include no apparent means to ensure that the elemental phosphorus in his wastewater (stated to be about 12 ppm $P_4$) is oxidized to soluble phosphate before incorporation into such suspension fertilizers. In U.S. Pat. Nos. 4,451,277, Barber, May 29, 1984; 4,537,615, Barber, Aug. 27, 1985; and 4,514,366, Barber, Apr. 30, 1985, there is further teaching that phosphorus sludge can be combusted in a graphite chamber to produce phosphoric acid which is then added to the phosphorus plant condenser water. The condenser water is subsequently treated with ammonia and processed to a suspension fertilizer. Again, no provisions are provided or taught for the oxidation of the elemental phosphorus dissolved or suspended in such condenser solution.

The teachings in U.S. Pat. No. 4,686,094, Roberts et al., Aug. 11, 1987, suggest treatment of elemental phosphorus-containing wastes by contacting the material with oxygen-containing gas such as air while maintaining thereover a cover of nonflammable liquid such as water. Upon complete oxidation, the phosphorus is recovered as much less hazardous dilute phosphoric acid. A major drawback and substantial disadvantage of this process is the very long reaction times required, i.e., upwards of 6 months. Also compounding such disadvantage of slow reaction are the attendant requirements of maintaining temperatures during cold-winter months and substantial input of mechanical shear energy to ensure interfacing of the normally very viscous sludge with the air introduced or sparged therewith.

In contrast to the teaching of the present invention, and the processing described above, most prior art processes involve the physical or chemical treatment of phosphorus sludge in order to enhance the recovery of elemental phosphorus therefrom, rather than the total chemical conversion of the phosphorus to a different, useful, by-product.

Examples of physical processes for recovering purified elemental phosphorus from phosphorus sludge may be found in the following: U.S. Pat. Nos. 3,084,029, Apr. 2, 1963; 3,113,839, Dec. 10, 1963; and 3,136,604, Jun. 9, 1964, Barber et al. (assigned to the assignee of the present invention), expound on the use of centrifugation as a means of recovering purified elemental phosphorus from phosphorus bearing sludges and residues. In U.S. Pat. No. 3,104,952, Hartig, Sep. 24, 1963, there is taught the mixing of phosphorus containing sludge with 75 to 95 weight percent aqueous $H_3PO_4$ followed by steam distillation in an inert atmosphere to recover purified elemental phosphorus. U.S. Pat. No. 4,481,176, Dodson et al., Nov. 6, 1984, suggest homogenization of the sludge followed by high-pressure filtration through thin cake filters. U.S. Pat. Nos. 4,492,627, Crea, Jan. 8, 1985, and 4,595,492, Crea et al., Jun. 17, 1986, propose the use of hydrocyclones as a means of separating elemental phosphorus from other impurities in phosphorus sludges. U.S. Pat. No. 4,762,697, Nield et al., Aug. 9, 1988, teach the use of distillation in an inert atmosphere followed by an input of air to burn off phosphorus residues and enhance solids recovery.

In a combination physical-chemical process the teachings in U.S. Pat. No. 4,608,241, Barber, Aug. 26, 1986, propose distilling phosphorus-containing waste to thereby separate and recover vaporized phosphorus and water from the non-volatile residues. The resulting non-volatile residues are then agglomerated and smelted in a submerged-arc electric furnace to further liberate phosphorus vapor for recovery. In the event that a phosphorus furnace is not available, the nonvolatile residues are diluted with large amounts of other feedstock and granulated to produce fertilizer products.

In addition to the physical processes described above, a number of chemical treatments have been suggested to enhance the recovery of elemental phosphorus from sludges. In general, the effectiveness of chemicals in these processes is assumed to result from their ability to attack and remove surface films and impurities from elemental phosphorus globules, thereby allowing them to coalesce and otherwise unite to form larger particles which are more amenable to separation and recovery by gravitational settling or other physical means. In general, the chemical is added at concentrations sufficient to promote the separation and removal of phosphorus from the sludge without significant chemical attack on the bulk of the phosphorus contained in the mixture. For example, the teachings in U.S. Pat. Nos. 3,436,184, Hinkebein, Apr. 1, 1969, and 3,442,621, Hinkebein, May 6, 1969, suggest the addition of chromic acid, or for that matter any oxidizing agent, to promote the separation and recovery of elemental phosphorus and thereby reduce the quantity of phosphorus remaining in the sludge. As another example of this chemical approach, see Imai et al. (*Jpn. Kokai Tokkyo Koho* 79 93,692, Jul. 24, 1974), wherein is proposed treatment of crude phosphorus with $HNO_3$—$H_2SO_4$ mixtures to allow separation of highly purified elemental phosphorus.

At first sight, both of the above chemical treatment processes may superficially appear similar to the $HNO_3$—$H_2SO_4$ oxidation method of the present invention. It should be noted, however, that the present invention, which is explained in greater detail infra, involves the use of concentrated $HNO_3$—$H_2SO_4$ mixtures in certain critical proportions to ensure the complete oxidation of all elemental phosphorus present in the sludge, while the above methods utilize chemicals for the destruction of films and impurities on the surface of phosphorus globules thereby allowing their coalescence and recovery as elemental phosphorus. Thus, these prior art disclosures actually teach away from the gist underlying the instant invention by suggesting the use of an $HNO_3$—$H_2SO_4$ mixture having a concentration and quantity much lower than the threshold combination found to be critical for practice of the instant invention.

SUMMARY OF THE INVENTION

The present invention relates to, and results from, the instant discovery of a new and novel process for the oxidation of the elemental phosphorus values contained in phosphorus sludges into much less hazardous oxyacids of phosphorus suitable for subsequent reaction with ammonia to produce nitrogen- and phosphorus-containing fertilizer products. More specifically, the instant invention and procedures for the practice thereof comprises reacting aqueous phosphorus sludge with certain selected nitric acid/sulfuric acid mixtures to thereby convert the elemental phosphorus content of the sludge into mixtures comprising very small amounts of orthophosphorous and preponderant amounts of orthophosphoric acids. The approximate chemistry of the process is shown by the following equations.

$$4HNO_3 + P_4 + 4H_2O \rightarrow 4H_3PO_3 + 4NO \qquad (1)$$

$$20HNO_3 + 3P_4 + 8H_2O \rightarrow 12H_3PO_4 + 20NO \qquad (2)$$

If desired, the mixtures of aqueous orthophosphorous and orthophosphoric acid resulting from the above reactions may subsequently be reacted with ammonia to produce aqueous solutions comprised preferably of very small amounts of ammonium orthophosphite and preponderant amounts of ammonium orthophosphate which solutions may be used either directly as liquid fertilizers or subsequently be dewatered and granulated to produce granular N—P fertilizers. The approximate equations for the reaction of orthophosphorous and orthophosphoric acids with ammonia to produce ammonium orthophosphites and ammonium orthophosphates are shown below.

$$NH_3 + H_3PO_3 \rightarrow (NH_4)H_2PO_3 \qquad (3)$$

$$NH_3 + H_3PO_4 \rightarrow (NH_4)H_2PO_4 \qquad (4)$$

As will be discussed in greater detail infra, it has now been found that the relative ratios of orthophosphate to orthophosphite produced during the oxidation process are of paramount importance from a plant physiological perspective and are controlled by the ratio of concentrated sulfuric acid to nitric acid used as feedstock to the instant process.

The phosphorus sludges usually employed as feedstock in the new and novel process of the instant invention comprise highly variable mixtures of elemental phosphorus globules; dust particles; metal oxide, silicate and phosphate particles; and carbonaceous particles suspended in water. Some of the suspended solid particles may contain small quantities of heavy metal constituents, such as, Pb, Cd, Cr, and Ba which were congeneric with the original phosphate rock feedstock. The elemental phosphorus content of these sludges may range, or be blended to range, from about 2 weight percent to about 20 weight percent and after settling may have the appearance of a brownish-gray mud covered with a relatively clear layer of so-called phossy water.

The nitric acid used in the practice of the instant invention is generally of commercial grade and preferably may range in concentration from about 55 weight percent to about 70 weight percent. Preferably, 25 percent to 50 percent excess of $HNO_3$, relative to elemental phosphorus, as depicted by the stoichiometry of Equation 2, supra, is employed to ensure sufficient oxidant for reaction with other sludge components such as metal oxides and carbonaceous materials.

The sulfuric acid used in the practice of the instant invention may range in concentration from about 93 weight percent to about 98 weight percent. It may be premixed with the nitric acid prior to reaction with the phosphorus sludge or it may be added to the sludge separate from the nitric acid.

It has now been determined that, in the practice of the instant invention, the sulfuric acid itself does not act as an oxidizing agent during the treatment of the phosphorus sludge, rather it provides a more efficient reaction solvent for oxidation of elemental phosphorus by the nitric acid. For example, nitric acid alone, ranging in concentration from 55 to 70 weight percent, was found capable of oxidizing only about one-half of the elemental phosphorus to orthophosphoric acid while almost all of the remaining elemental phosphorus was oxidized to orthophosphorous acid, i.e., about 30 ppm of the elemental phosphorus remaining unreacted. On the other hand, when the reaction of phosphorus sludge was conducted with a 1:1 weight ratio mixture of 96 percent $H_2SO_4$:56 percent $HNO_3$ there was effected a conversion of at least about 90 percent of the elemental phosphorus to orthophosphoric acid and the remainder to orthophosphorous acid and with only 2 ppm or less of elemental phosphorus remaining unreacted to either form. It has now been found that even higher conversions of phosphorus to orthophosphate can be achieved at higher weight ratios of $H_2SO_4$:$HNO_3$.

This observed phenomenon of sulfuric acid added to the nitric acid to substantially promote the complete oxidation of phosphorus to its highest oxidation state (orthophosphate) was completely unexpected. For instance, the use of sulfuric acid as a solvent for nitration reactions is quite well known (kirk-Othmer, *Encyclopedia of Chemical Technology*, Third Edition, Volume 15, John Wiley & Sons, New York, pp. 841-853, 1982). Also, sulfuric acid has proven to be an effective solvent for the nitric acid oxidation of cellulosic materials to produce oxalic acid (Jack M. Sullivan, Joseph W. Williard, David L. White, and Yong K. Kim, *Ind. Eng. Chem. Prod. Res. Dev.*, Vol. 22, No. 4, pp. 699-709, 1983). In both of these cases, however, sulfuric acid acts as a moderating agent—allowing less than fully oxidized products to be collected. The use of nitric acid alone in these reactions generally leads to the complete oxidation of the substrate to produce carbon dioxide and water, i.e., products of highest oxidation states. Hence, the instant discovery of this action of sulfuric acid for promoting, in phosphorus- containing waste sludge, the complete oxidation of elemental phosphorus is opposite to that normally expected.

This characteristic of added sulfuric acid to promote the conversion of elemental phosphorus to orthophosphoric acid (orthophosphate) relative to orthophosphorous acid (orthophosphite) enhances the value of the resulting oxidized product for subsequent conversion to a fertilizer. For example, green house tests (MacIntire et al., *Agronomy Journal*, Vol. 42, No. 11, November, 1950, pp. 543-549) suggest that orthophosphites are moderately toxic to plants when applied to the soil in high concentrations. This toxicity is reported to be diminished as orthophosphite is biochemically oxidized to orthophosphate. It also appears that the toxicity of orthophosphite is suppressed in the presence of adequate orthophosphate. In any event, as described above, the problem has now been essentially eliminated by conducting the sludge oxidation in a suitable $H_2SO_4$:$HNO_3$ reaction medium.

The oxidation reaction of the present invention is generally conducted at the boiling point (212°-240° F.) of the resulting reaction solution, thereby allowing evaporative cooling to remove the excess heat produced. The $H_2SO_4$/$HNO_3$ mixture may be added to the phosphorus sludge, or the phosphorus sludge may be added to the $H_2SO_4$/$HNO_3$ mixture, or the sludge and $H_2SO_4$/$HNO_3$ mixture may be added simultaneously to the reaction vessel (as when the process is conducted on a continuous basis). During the early stages, the reaction is vigorous and self-sustaining with a copious evolution of orange-brown nitrogen dioxide fumes. A foam retardant, such as Na-sulfonated oleic acid (for example, Tennessee Chemical Co.'s OA-5) may be added in small quantities to the liquid surface to control foaming. NOTE: Any references made herein to materials and/or apparatus which are identified by means of trademarks, trade names, etc., are included solely for the convenience of the reader and are not intended as, or to be construed, an endorsement of said materials and/or apparatus. If desired, the nitric oxides which are evolved from the foam may be treated with air or oxygen and recovered as dilute nitric acid in an aqueous scrubber column.

As a further important and significant embodiment of the present invention, it has also been discovered that the foaming problem is substantially less severe if the phosphorus sludge is added to the $HNO_3$:$H_2SO_4$ oxidation medium, rather than adding the $HNO_3$:$H_2SO_4$ oxidant to the sludge.

During its later stages, the reaction moderates and heat energy must be added to maintain the boiling point of the reacting solution. A total reaction time of 1.5-3.0 hours, including an approximate 30-minute reagent addition period, is generally sufficient to ensure complete oxidation of the phosphorus.

As a still further major and significant discovery of the present invention, it has now also been found that the resulting oxidized intermediate product may be filtered or centrifuged to remove insoluble sulfate and phosphate salts of certain heavy metals, such as those of Pb, Cd, Ba, Cr, etc., derived from the original phosphate rock. This separation is considerably enhanced when mixed $HNO_3$/$H_2SO_4$ oxidant is used, rather than $HNO_3$ alone. Notwithstanding these considerations, the solution may be directly ammoniated to produce suspension or granular fertilizers.

As indicated above, the nitric acid oxidation of elemental phosphorus is a highly exothermic process. As is the case with any exothermic reaction, care must be taken to ensure that sufficient heat transfer capacity is available to prevent a high temperature excursion which might lead to a thermal explosion. In the practice of the present process for phosphorus sludge oxidation, the rise in temperature is limited by the boiling point of the reacting mixture. Hence, evaporative cooling provides a convenient means of controlling the temperature (at the boiling point).

Under some conditions, however, it may be necessary to ensure that sufficient water is present to provide the required cooling. A preliminary estimate of the quantity of water required can be obtained from thermodynamic considerations. Consider the reactions:

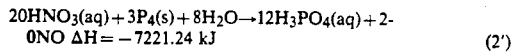

$$20HNO_3(aq) + 3P_4(s) + 8H_2O \rightarrow 12H_3PO_4(aq) + 20NO \quad \Delta H = -7221.24 \text{ kJ} \quad (2')$$

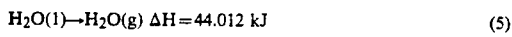

$$H_2O(l) \rightarrow H_2O(g) \quad \Delta H = 44.012 \text{ kJ} \quad (5)$$

where equations 2' and 5 represent the oxidation of phosphorus and the evaporation of water, respectively. The oxidation of three moles of $P_4$ supplies enough heat to evaporate $7221.24/44.012 = 164.07$ moles of water. An additional 8 moles of water is consumed by the oxidation reaction (eq. 2'). Therefore, the critical mole ratio of $H_2O:P_4$ is $(164.07+8)/3 = 57.36$. On a weight basis the ratio becomes $57.36*18.01/123.90 = 8.34$. Hence, 8.34 pounds of water should be available for each pound of phosphorus oxidized. This water may be supplied principally by both the phosphorus sludge and the input aqueous $HNO_3$.

The above thermodynamic estimate, of 8.34 pounds of $H_2O$ per pound of elemental phosphorus, represents an overestimate of the quantity of water actually required since no consideration is given to heat loss, other than by water evaporation, or to the fact that an excess of $HNO_3$ and added $H_2SO_4$ is generally employed. Nevertheless, this example is provided to remind those not skilled in this art of the need to supply adequate heat removal capacity when conducting the process of the present invention.

OBJECTS OF THE INVENTION

The principal object of the present invention is to provide an economically, conservatively, and environmentally sound method for processing elemental phosphorus containing aqueous residues ("sludges" or "muds") into much less hazardous oxy-acids of phosphorus which in turn may be further treated with ammonia and processed into nitrogen- and phosphorus-containing fertilizer products.

A further object of the present invention is to reduce the elemental phosphorus content of the oxidized intermediate product to such a low level as to allow its use as an intermediate for the production of a benign and useful products, such as fertilizer, without violating health, safety, or environmental considerations.

A still further object of the present invention is to provide a procedure for removing certain potentially environmentally hazardous metal sulfate and phosphate salts such as those of the heavy metals; Pb, Cd, Ba, Cr, etc., which can be derived from the dust component of the sludge and which may be conveniently precipitated from the oxidized intermediate product of the present invention.

Still further and more general objects and advantages of the present invention will appear from the more detailed description set forth below, it being understood, however, that this more detailed description is given by way of illustration and explanation only, and not necessarily by way of limitation since various changes therein may be made by those skilled in the art without departing from the true spirit and scope of the present invention.

DESCRIPTION OF THE DRAWINGS

The present invention, together with further objects and advantages thereof, will be better understood from a consideration of the following description taken in connection with the accompanying drawings in which.

Figure 1:
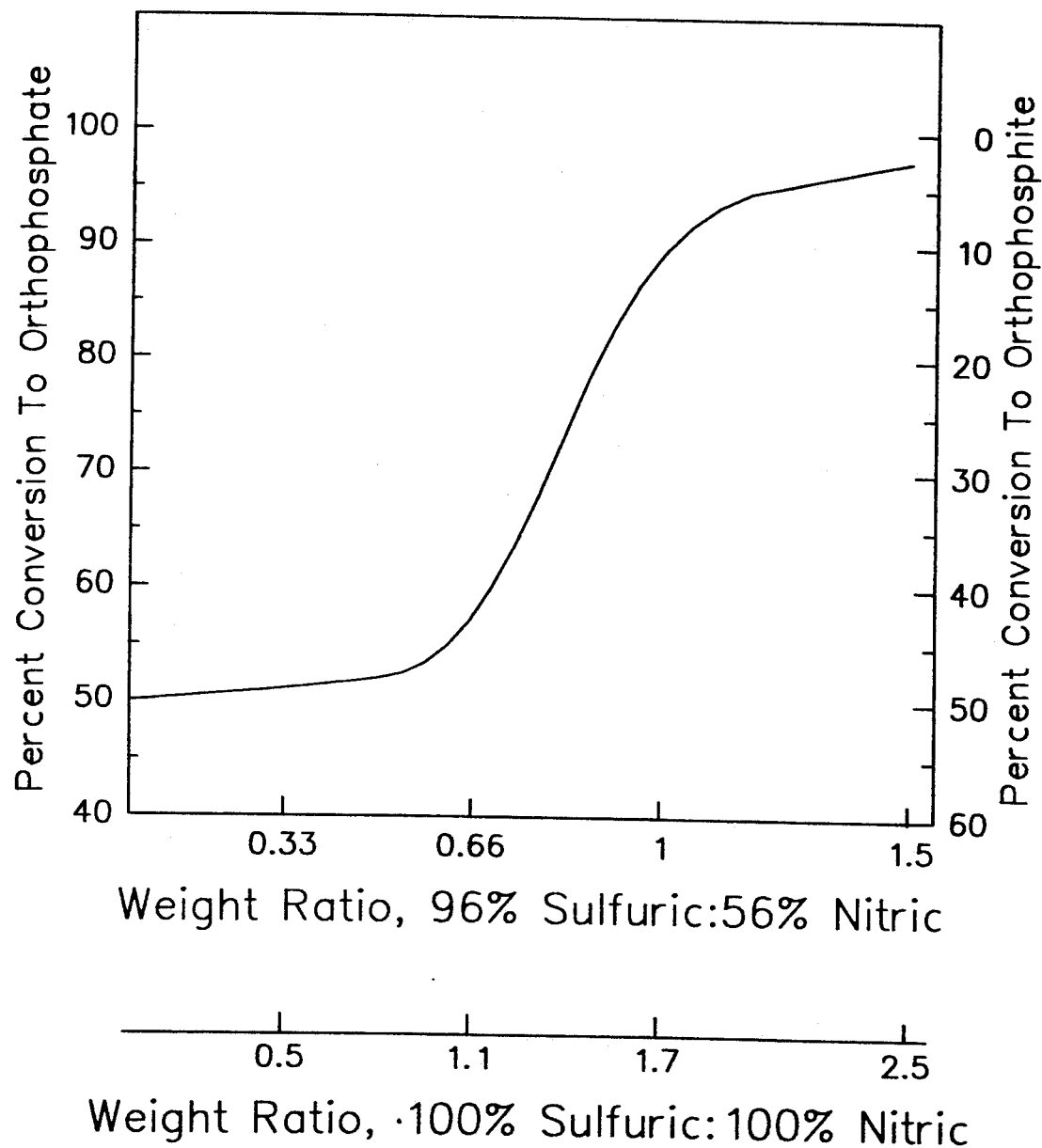
FIG. 1 is a graphical illustration depicting the relationship between the relative proportions of sulfuric acid/nitric acid used to treat phosphorus-containing waste sludge and the resulting effected conversion to orthophosphate.

Referring now more specifically to FIG. 1, therein is illustrated the remarkable and quite unexpected action of sulfuric acid in promoting the conversion of elemental phosphorus to orthophosphate in which the percentage of total phosphorus as orthophosphate is plotted against the weight ratio of $H_2SO_4$ to $HNO_3$ employed in the oxidation process. The sharp jump in conversion to orthophosphate at a ratio $H_2SO_4:HNO_3$ of about 1.7 should be noted. Hence, although lower weight ratios of $H_2SO_4:HNO_3$ provide for the substantial conversion of input elemental phosphorus, ratios greater than about 1.7 are required to ensure that at least 90 percent of the phosphorus is converted to the orthophosphate form and axiomatically that less than 10 percent is converted to the less desirable orthophosphite form. For convenience, in the conduct of these tests the input $H_2SO_4$ was of 96 percent by weight concentration and the $HNO_3$ was of 56 percent by weight concentration. If different input acid concentrations are used, the ratio is accordingly proportionally adjusted. Accordingly, the two abscissas illustrated represent both these test and the theoretical conditions. It should be appreciated that although this graphical representation is conveniently presented in two-dimensional form, there are more than two variables to be considered. These include, of course, the weight percent of the sulfuric acid, the weight percent of the nitric acid, and the weight percent of the phosphorus sludge in terms of either elemental phosphorus or total phosphorus or total phosphorus plus other solids. In any event, the significance of the depiction in FIG. 1 is that if the weight ratio of sulfuric acid to nitric acid is above a certain threshold, there will result a substantial conversion of the phosphorus oxidized by such mixture to the orthophosphate form rather than to the orthophosphite form which, in turn, yields an intermediate which by itself or upon subsequent ammoniation to fertilizer material has eliminated therefrom substantial amounts of the toxic phosphite form. For instance, it may be appreciated that the inflection point of this curve for the particular 96 percent sulfuric:56 percent nitric acid mixture shown occurs at a weight ratio between about 0.85 and about 0.9. For an acid mixture of 100 percent sulfuric and 100 percent nitric equivalent, the corresponding weight ratio is about 1.5, and the corresponding weight ratio in which at least about 90 percent of the phosphorus is converted to the phosphate form is about 1.7.

Since the effect of using sulfuric acid more concentrated than the 96 percent indicated in FIG. 1 tends to shift the inflection point to lower weight ratios, and since a likewise observation may be seen when such sulfuric acid of the same or more concentrated than 96 percent is used in combination with nitric acid more concentrated than 56 percent, it will be appreciate that the objectives of the instant invention for maximizing the percent conversion of elemental phosphorus in the sludge to the orthophosphate form will generally be attained at a minimum weight ratio, on a 100 percent equivalent basis, of about 1.7. In instances wherein weaker grades of commercially available sulfuric acid, such as 93 percent, are to be mixed with weaker grades of nitric acid than shown herein and ranging downwards to about 40 weight percent $HNO_3$, it is suggested that the minimum weight ratio, on 100 percent basis of $H_2SO_4:HNO_3$, be above such threshold of 1.7, i.e., be at least about 2. In any event, operating and practicing within the higher range will ensure attaining such maximum benefits.

It should also be appreciated that data, from which this depiction was derived, were obtained by utilizing a phosphorus sludge containing about 10 percent total phosphorus and about another 5 percent solids comprised of carbonaceous materials, silicates, and asunder other materials including in some instances suspended fine particles of phosphate rock and/or precipitator dust. Accordingly, it should be appreciated that the other 80 or 85 percent of such sludge is composed mainly of aqueous media which can give rise to acting as a diluent for both the sulfuric and nitric acid utilized in the instant invention. Further, since the total phosphorus content of other phosphorus containing sludges derived either directly or indirectly from the winning of phosphate values from phosphate rock in electric-arc phosphorus furnaces may contain anywhere from about 2 percent to upwards of 20 percent total phosphorus, it can be seen that the range of aqueous media content of such sludge available for acting as such a diluent, supra, can vary over a range from about 70 percent to perhaps as much as about 95 percent. Nevertheless, since the unexpected effect of the sulfuric acid in combination with the nitric acid as utilized and taught herein appears to be based on some phenomenon in addition to a desiccating effect of such sulfuric, it has now been determined that phosphorus sludges containing aqueous media content generally in the range of those used in the examples herein later described and ranging from about 80 percent to 90 percent water, will give essentially the same or similar results as depicted in FIG. 1. Accordingly, essentially no substantial adjustments to the weight ratio recommended above, based on 100 percent equivalent concentration of both sulfuric and nitric, need be made except when $HNO_3$ and $H_2SO_4$ approaching the lower concentration limits of the operating range (see Invention Parameters, infra) are employed.

Of course, it should be further recognized that the phosphorus content of the sludge may be brought into the desired range by dewatering or by blending of sludges of higher or lower phosphorus content. One convenient approach to effecting a dewatering, supra, would be to allow the sludge to settle for a convenient period of time and then to decant the phossy water or supernatant fluid thereover.

Figure 2:
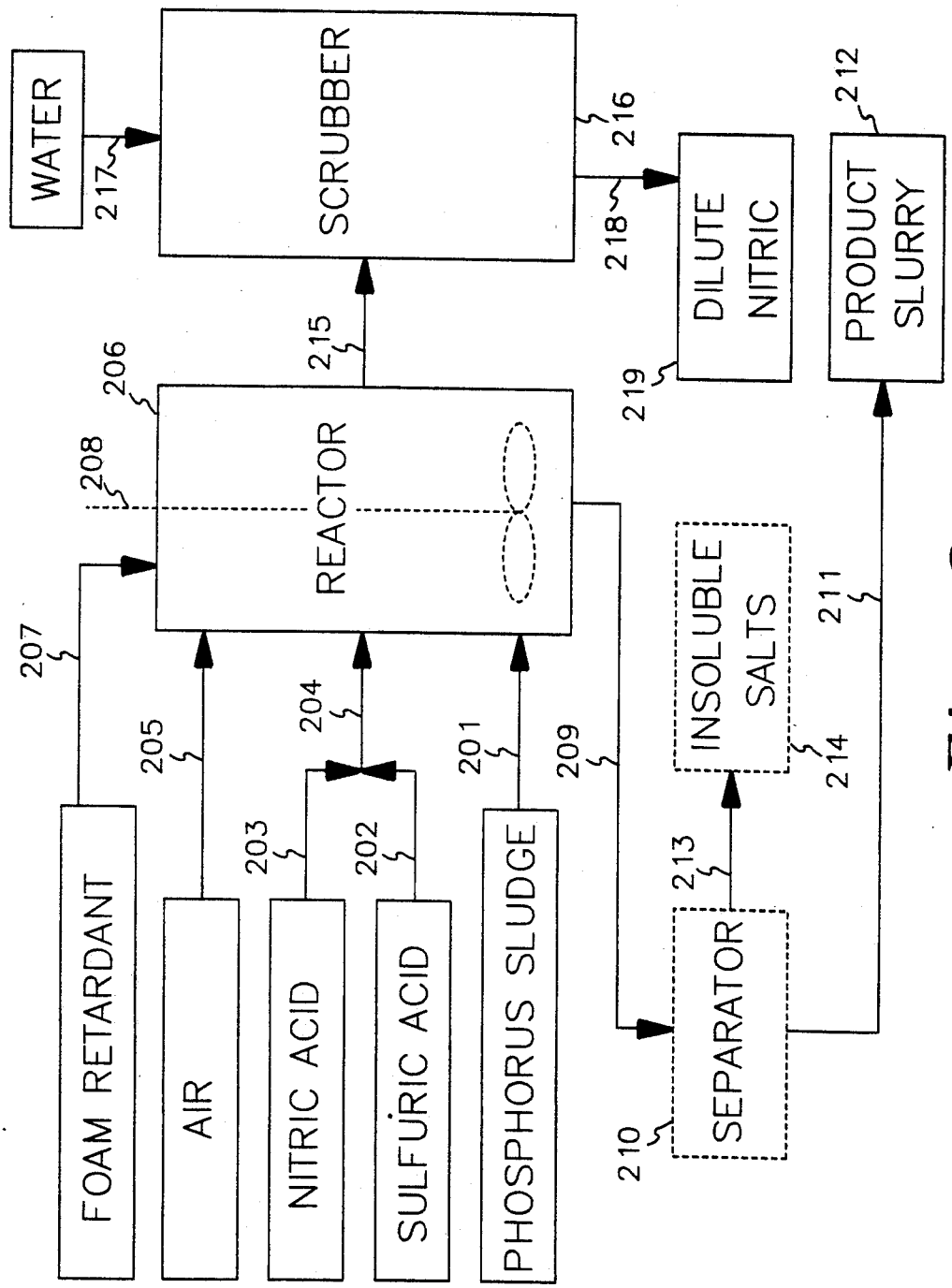
FIG. 2 is a process flow diagram of the instant invention in the most preferred embodiment thereof.

Referring now more specifically to FIG. 2, aqueous phosphorus sludge, preferably containing in the range from about 5 weight percent to about 12 weight percent elemental phosphorus, along with various ratios of concentrated sulfuric and nitric acids are fed from any of many convenient sources via lines 201, 202, 203, and 204, respectively, to reactor 206, in which the oxidation reaction is allowed to proceed at the boiling point (generally about 212° F. to about 260° F.) of the resulting slurry therein, also not shown, for a time ranging from about 1-6 hours. Air, from any convenient source, is fed via line 205 to reactor 206 in order to oxidize any nitric oxide, NO, produced during the reaction, supra, to nitrogen dioxide, $NO_2$, for subsequent recovery as dilute nitric acid by scrubber means 216.

In a first alternative embodiment of the present invention, the resulting product slurry (not shown) is removed from reactor 206 via line 209 to separation means 210, shown in phantom line, which conveniently may be a hydrocylone, a centrifuge, a filter, or some other like device wherein solid salts and residues are separated from the liquid and removed via line 213 to storage 214, also shown in phantom line. This solids removal step is optional, merely providing a means of removing certain potentially deleterious heavy metal salts such as those of Pb, Cd, Ba, and Cr which might pose environmental problems.

Depending on whether this first alternative embodiment is or is not utilized, the oxidized liquid product from reactor 206 or separation means 210 is led via lines 209 or 211 to product storage 212. Oxides of nitrogen, generated during the oxidation reaction, are led via line 215 to scrubber means 216 where they are absorbed by water, entering via line 217, to produce dilute nitric acid. The dilute resulting nitric acid, not shown, is led via line 218 to storage 219.

In a second alternative embodiment of the present invention, a foam retardant from any convenient source may be added via line 207 to the foam surface, also not shown, in reactor 206 in order to control foaming during the oxidation reaction.

In a third alternative embodiment of the present invention, agitator 208, shown in phantom line, may be utilized in reactor 206 to increase mixing and to maintain solids in suspension during the processing.

In a fourth alternative embodiment of the present invention, it is pointed out to those not skilled in the art of heat transfer technology that upon scale-up of reactor 206, the heat losses will be reduced due to the reduction of the surface area to volume ratio. In this event, flash cooling alone may not provide an adequate cooling mechanism to avoid the volatilization of a significant portion of nitric acid and thereby reduce the amount of acid available to satisfy the stoichiometry of the reaction. In this situation, it will become necessary to provide an alternate source of cooling or control the introduction of reactants so as to adequately control the rate of heat generated. The method which demonstrated the best solution to this heat balance problem comprised splitting the feedstream of nitric acid so that preferably about 75 percent, and operationally as much as about 95 percent, of the nitric acid is fed to reactor 206 either concurrently with or prior to the addition of sulfuric acid thereinto. The remaining portion of the nitric acid was fed to reactor 206 after all of the phosphorus-containing slurry had been introduced thereinto and after the slurry temperature had fallen to approximately 225° F. to 235° F. Another alternative, however not as effective as the split feed approach mentioned previously, would be the reduction of the slurry feed rates to control the reactor temperature.

Figure 3:
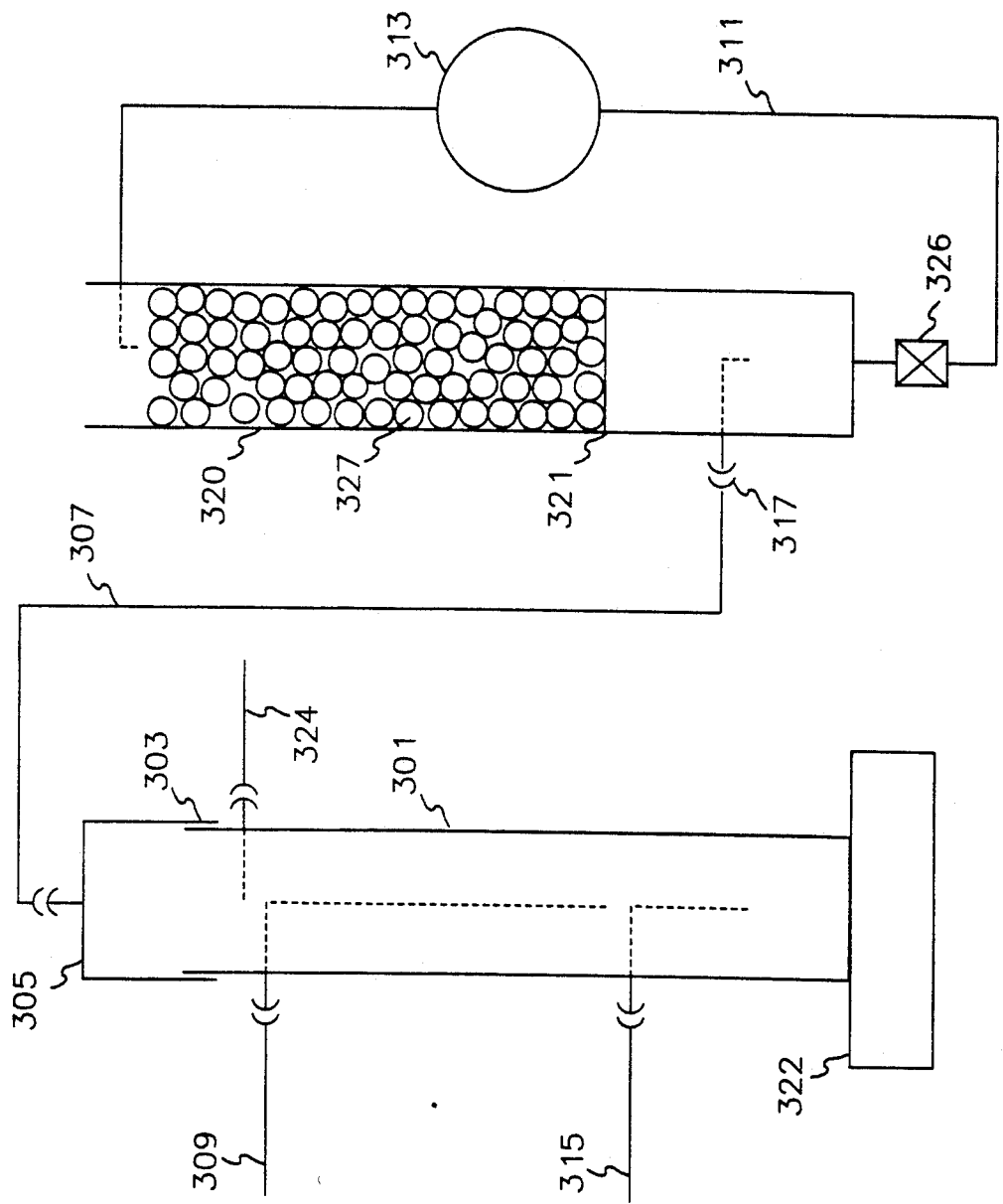
FIG. 3 is a schematic representation of the laboratory scale reaction system used for conduct of many of the tests reported in the examples discussed, infra.

Referring now more specifically to the schematic representation shown, not to scale, in FIG. 3, the dimensions of cylindrical Pyrex reactor 301 and scrubber 320 were each 90 mm ID×122 cm total height. Reactor 301 was equipped near the top thereof with male 103/60 ground glass joint 303 to allow the installation of cap 305. Conduit means between reactor 301 and scrubber 320 are generally shown as line 307 and comprise glass tubing (10 mm OD×8 mm ID). Similar sized glass tubing comprised other gas flow lines including line 309 for input of air or oxygen. On the other hand, the several liquid flow lines as, for example, line 311 and feed line 315 for input of phosphorus sludge and/or nitric-sulfuric acids were also provided as glass tubing but in the size of 12 mm OD and 10 mm ID. Recycle of scrubbing liquor was by means of fluid moving device 313 (preferably a peristaltic style pump). For ease of assembly and disassembly, connections between such gas lines and reactor 301 and scrubber 320 were effected through the use of 18/9 ball joints, one of which is identified for convenience as 317. Device 322 generally comprised a combination hot plate and magnetic stirrer upon which reactor 301 was supported to allow for simultaneous heating and stirring of the reaction mixture therein. Although not shown, the stirring bar used in combination therewith was typically 2.5 inches long and Teflon coated. After being provided with sufficient agitation to provide homogeneity, phosphorus sludge, from a source not shown, entered reactor 301 through line 315. Likewise, both nitric and sulfuric acids from sources not shown were also introduced to reactor 301 via feed line 315. In instances when it was desired to feed a foam retardant to reactor 301, it was introduced via line 324. For convenience, a peristaltic type pump, not shown, was utilized for introducing such materials. Also not shown, the bottom portion of reactor 301 was provided with a thermocouple well which extended to approximately half its diameter and approximately 3.5 cm above the floor of reactor 301 and from which temperatures were measured conveniently with a digital thermocouple thermometer equipped with a type K probe, also not shown. To ensure a reasonably long residence time for oxidant gases within reactor 301, the end of line 309 extended down to essentially the center of reactor 301 and terminated about 20 cm above the floor thereof. To expedite wash-down and recovery of solution from scrubber 320, exit means 326, generally comprising in one embodiment thereof a No. 4 stopcock, was provided. In addition, scrubber 320, near the bottom portion thereof was provided with heavy stainless steel screen 321 which effectively vertically partitioned scrubber 320 at about 30 cm above the bottom thereof and provided support for about 80 cm of 1-inch stainless steel Pall packing, one of which is identified at 327.

EXAMPLES

In order that those skilled in the art may better understand how the present invention can be practiced, the following examples are given by way of illustration, but not by way of limitation.

These examples are provided to demonstrate the influence of various variables, such as reaction temperature, reaction time, weight ratio of $HNO_3$ to sludge, weight ratio $H_2SO_4:HNO_3$, order of reagent addition, thermal self sustainability, and use of a foam retardant in the process of the present invention, and the resulting conversion of elemental phosphorus, contained in residue sludges, to orthophosphoric and orthophosphorous acids. In particular, the examples demonstrate the distinct advantage of using certain mixed $H_2SO_4:HNO_3$ oxidation medium over the use of $HNO_3$ alone.

EXAMPLE I

Using equipment of the type illustrated in FIG. 3, supra, a first experiment was conducted to test the oxidation of phosphorus sludge with commercial grade nitric acid alone. Nitric acid, in the amount of 313.3 grams at a concentration of 57.7 percent, was added to the reactor to provide a 47.5 percent excess of $HNO_3$ relative to the stoichiometry of Equation 2. The nitric acid was stirred and preheated to about 140° F. Phosphorus sludge, 524 grams, containing 6.90 percent elemental phosphorus and 9.07 percent total phosphorus, was pumped from a stirred vessel into the reactor over a 50-minute period. Air was fed into the reactor above the liquid layer at a rate of 1,078 mL/min. Gases leaving the reactor were led to the scrubber. About 500 grams of water were utilized as the scrubber medium.

The reaction was initially vigorous and thermally self-sustaining with vigorous boiling and the evolution of copious quantities of brown nitrogen oxide fumes. The temperature of the reaction solution rose to a maximum value of about 227° F. Thereafter the reaction began to moderate and it was subsequently necessary to add supplemental heat to maintain the boiling point at about 215° F. for the remainder of the 1.5-hour total reaction period. About 52 grams of 10 percent OA-5 foam retardant (Na-sulfonated oleic acid) was added dropwise as needed to the foam layer to control foaming during the vigorous stage of the reaction. Chemical analysis of the resulting 838.5 grams of oxidized product showed it to contain 1.0 ppm elemental phosphorus, 5.20 percent total phosphorus, and 11.7 percent nitric acid. The 1,000 grams of combined scrubber solution and scrubber rinsewater contained 0.01 percent total phosphorus and 2.52 percent nitric acid.

EXAMPLE II

Again, using equipment of the type illustrated in FIG. 3, supra, a second experiment was conducted to test commercial grade nitric acid, without initial supplemental heating, as an oxidant for phosphorus sludge. Phosphorus sludge, 497 grams containing 7.86 percent elemental phosphorus and 9.77 percent total phosphorus, was added to the reactor. Nitric acid, 261.48 grams of 56.4 percent $HNO_3$, to provide 11.5 percent excess of $HNO_3$, was pumped into the stirred sludge over a 14-minute period. Air was added to the reactor at a rate of 2,797 mL/min. Approximately 500 grams of water was added to the scrubber. The reaction temperature rose relatively slowly from about 70° F. to about 120° F. during the first 8 minutes of the nitric acid addition period, at which point the reaction became very vigorous and the temperature rose rapidly to about 215° F. during the next 2 minutes. The reaction remained thermally self-sustaining with considerable foam formation during the first 30 minutes, after which supplemental heat was required to retain the boiling point of about 214° F. for the remainder of the 3.0-hour reaction time. About 9.4 grams of 10 percent OA-5 foam retardant was added to control foaming during the course of the reaction. Chemical analysis of the 687.1 grams of product showed it to contain 18.2 ppm elemental phosphorus, 7.18 percent total phosphorus, and 7.02 percent nitric acid. Of the total phosphorus, 57 percent was found to be present as orthophosphate ($PO_4$) and 43 percent as orthophosphite ($PO_3$). The 411.6 grams of reactor rinsewater was found to contain 0.11 percent total phosphorus and 0.81 percent nitric acid. The 1,271.9 grams of combined scrubber solution and scrubber rinsewater was found to contain 0.02 percent total phosphorus and 1.00 percent nitric acid.

EXAMPLE III

Once again, using equipment of the type illustrated in FIG. 3, supra, a third experiment with commercial nitric acid alone was conducted to determine the influence of using a large excess of nitric acid upon the conversion of elemental phosphorus to orthophosphate. The experiment also involved the addition of phosphorus sludge to nitric acid, rather than nitric acid to phosphorus sludge, since other experiments indicated that this procedure resulted in less foam formation. Nitric acid, 535.8 grams containing 56.46 percent $HNO_3$, was added to the reactor to provide 130 percent excess $HNO_3$. The acid was preheated with stirring to about 147° F. Phosphorus sludge, 493 grams containing 7.86 percent elemental phosphorus and 9.77 percent total phosphorus, was pumped into the reactor over a 17-minute period. Air was added at a rate of 2,800 mL/min. The reaction was very vigorous and thermally self-sustaining during the first 35 minutes of the reaction period. The temperature rose to about 225° F. and the foam level reached about three-fourths of the height of the reactor before about 0.1 gram of 10 percent OA-5 foam retardant was used to suppress the foam. The reaction was continued with supplemental heating to maintain the boiling point of about 217° F. for the remainder of the total 3.0-hour reaction period. The 853.9 grams of reaction product was found to contain 5.9 ppm elemental phosphorus, 4.94 percent total phosphorus, and 21.28 percent nitric acid. Of the total phosphorus, 57 percent was found to be present as orthophosphate and 43 percent as orthophosphite. The 343.5 grams of reactor rinsewater was found to contain 0.12 percent total phosphorus and 0.85 percent nitric acid. The 388.3 grams of scrubber solution was found to contain 0.14 percent total phosphorus and 4.99 percent nitric acid. The 544.6 grams of scrubber rinsewater contained negligible phosphorus and 0.54 percent nitric acid.

EXAMPLE IV

And again, using equipment of the type illustrated in FIG. 3, supra, a final experiment was conducted to test concentrated (70 percent) nitric acid alone as an oxidant for phosphorus sludge. Nitric acid, 246.97 grams of 69.50 percent, was added to the reactor and preheated with stirring to about 140° F. Phosphorus sludge, 513 grams containing 7.50 percent elemental phosphorus and 8.98 percent total phosphorus, was pumped into the reactor over a 24-minute period. Air was added to the reactor at a rate of 2,770 mL/min. Aqueous caustic solution, 587.2 grams of 13.9 percent NaOH, was employed in the scrubber. The reaction was very vigorous with some flame formation at the surface of the solution during the first few minutes. The temperature reached 233° F. after 5 minutes, but declined slowly thereafter and supplemental heating was required to maintain the boiling temperature of about 218° F. during the final one hour of the total 1.5-hour reaction time. About 5 grams of 10 percent OA-5 foam retardant was used to control foaming. The 716.6 grams of reaction product was found to contain 9.9 ppm elemental phosphorus, 6.27 percent total phosphorus, and 12.15 percent nitric acid. Of the total phosphorus, 47 percent was present as orthophosphate and 53 percent as orthophosphite. The 651.1 grams of reactor rinsewater contained 0.11 percent total phosphorus and 1.26 percent nitric acid. The 972.7 grams of combined scrubber solution and scrubber rinsewater contained 0.01 percent total phosphorus and 1.84 percent nitric acid.

EXAMPLE V

A 1:3 ratio mixture of 96 percent $H_2SO_4$ and 56 percent $HNO_3$ was tested as an oxidant for phosphorus sludge. Using equipment of the type illustrated in FIG. 3, supra, a 411.45 gram mixture of sulfuric and nitric acid, containing 24.17 percent $H_2SO_4$ and 41.76 percent $HNO_3$, prepared by adding one part by weight of 95-98 percent $H_2SO_4$ to three parts by weight of 56 percent $HNO_3$, was added to the reactor and stirred. Phosphorus sludge, 498 grams containing 7.50 percent elemental phosphorus and 9.32 percent total phosphorus, was pumped into the reactor over a 23-minute period. Air was added to the reactor at a rate of 2,838 mL/min. Caustic solution, 580.8 grams containing 13.9 percent NaOH, was added to the scrubber. The reaction temperature rose from about 86°-232° F. over an 8-minute period. The reaction was vigorous and thermally self-sustaining during the initial 30 minutes of the reaction period. Thereafter, supplemental heating was required to maintain the boiling point of about 220° F. for the remainder of the 2-hour total reaction time. About 12 grams of 10 percent OA-5 foam retardant was used to control the foaming. The resulting 868 grams of reaction product contained 1.3 ppm elemental phosphorus, 5.21 percent total phosphorus, 10.03 percent nitric acid, and 11.44 percent sulfuric acid. Of the total phosphorus, 50 percent was present as orthophosphate and 50 percent as orthophosphite. The 622 grams of reactor rinsewater contained 0.065 percent total phosphorus, 0.67 percent nitric acid, and 0.13 percent sulfuric acid. The 1,002 grams of combined scrubber solution and scrubber rinsewater contained 0.02 percent total phosphorus, 1.62 percent nitric acid, and 0.02 percent sulfuric acid.

EXAMPLE VI

A 2:3 ratio mixture of 96 percent $H_2SO_4$ and 56 percent $HNO_3$ was tested as an oxidant for phosphorus sludge. Using equipment of the type illustrated in FIG. 3, supra, a 512.7 gram mixture of sulfuric and nitric acid, containing 38.7 percent $H_2SO_4$ and 33.6 percent $HNO_3$, prepared by adding two parts by weight of 95-98 percent $H_2SO_4$ to three parts by weight of 56 percent $HNO_3$, was added to the reactor and preheated with stirring to 128° F. Phosphorus sludge, 495 grams containing 7.50 percent elemental phosphorus and 9.52 percent total phosphorus, was pumped into the reactor over a 15-minute period. Air was added to the reactor at a rate of 2,778 mL/min. Water, 509 grams, was added to the scrubber. The reaction was allowed to proceed at temperatures of 213°-240° F. for a total of two hours. The resulting 913.4 grams of product was found to contain 3.22 ppm elemental phosphorus, 4.58 percent total phosphorus, 9.09 percent nitric acid, and 21.26 percent sulfuric acid. Of the total phosphorus, 53 percent was present as orthophosphate and 47 percent as orthophosphite. The 635.4 grams of reactor rinsewater contained 0.11 percent total phosphorus, 0.54 percent nitric acid, and 0.43 percent sulfuric acid. The 929.7 grams of combined scrubber solution and scrubber rinsewater contained 0.09 percent total phosphorus, 3.01 percent nitric acid, and 0.03 percent sulfuric acid.

EXAMPLE VII

A 1:1 ratio mixture of 96 percent $H_2SO_4$ and 56 percent $HNO_3$ was tested as an oxidant for phosphorus sludge. Using equipment of the type illustrated in FIG. 3, supra, a 616 gram mixture of sulfuric acid and nitric acid, containing 48.4 percent $H_2SO_4$ and 28.0 percent $HNO_3$, prepared by adding one part by weight of 95-98 percent $H_2SO_4$ to one part by weight of 56 percent $HNO_3$, was added to the reactor and preheated to 182° F. with stirring. Phosphorus sludge, 508 grams containing 7.50 percent elemental phosphorus and 8.98 percent total phosphorus was pumped into the reactor over a 37-minute period. Air was added to the reactor at a rate of 2,768 mL/min. Caustic solution, 585 grams of 13.9 percent NaOH, was employed in the scrubber. The reaction was initially very vigorous with flashes of flame and the evolution of dense brown fumes at the surface of the liquid. The reaction was thermally self-sustaining with temperatures reaching about 235° F. during the initial 40 minutes. Thereafter, supplemental heating was required to maintain the boiling temperature of about 228° F. during the remainder of the total 1.5-hour reaction period. About 11 grams of 10 percent OA-5 foam retardant was added to control foaming. The resulting 1022 grams of product contained 0.8 ppm elemental phosphorus, 4.45 percent total phosphorus, 4.59 percent nitric acid, and 28.3 percent sulfuric acid. Of the total phosphorus, 93 percent was present as orthophosphate and 7 percent as orthophosphite. The 403 grams of reactor rinsewater contained 0.24 percent total phosphorus, 3.24 percent nitric acid, and 1.45 percent sulfuric acid. The 978 grams of combined scrubber solution and scrubber rinsewater contained 0.05 percent total phosphorus and 3.06 percent nitric acid.

EXAMPLE VIII

A 3:2 ratio mixture of 96 percent $H_2SO_4$ and 56 percent $HNO_3$ was tested as an oxidant for phosphorus sludge. Using equipment of the type illustrated in FIG. 3, supra, a 765.2 gram mixture, containing 58.0 percent $H_2SO_4$ and 22.6 percent $HNO_3$ prepared by mixing three parts by weight of 95-98 percent $H_2SO_4$ with two parts by weight of 56 percent $HNO_3$, was added to the reactor and preheated with stirring to 115° F. Phosphorus sludge, 499 grams containing 7.50 percent elemental phosphorus and 9.52 percent total phosphorus was pumped into the reactor over a 27-minute period. Air was added to the reactor at a rate of 2,778 mL/min. Water, 525 grams, was placed in the scrubber. The reaction was very vigorous with considerable flame formation and brown fume evolution during the early phase. The reaction was thermally self-sustaining during the first 45 minutes with the reaction temperature reaching about 241° F. Thereafter supplemental heat was required to maintain the boiling point of about 225° F. during the remainder of the 2-hour total reaction period. About 18 grams of OA-5 foam retardant was added to control foaming. The 1,089.2 grams of reaction product contained 1.75 ppm elemental phosphorus, 3.70 percent total phosphorus, 5.67 percent nitric acid, and 39.2 percent sulfuric acid. Of the total phosphorus 98 percent was present as orthophosphate and 2 percent was present as orthophosphite. The 614.8 grams of reactor rinsewater contained 0.06 percent total phosphorus, 1.89 percent nitric acid, and 0.80 percent sulfuric acid. The 962.1 grams of combined scrubber solution and rinsewater contained 0.18 percent total phosphorus, 2.14 percent nitric acid, and 0.03 percent sulfuric acid.

EXAMPLE IX

This example illustrates how the process of the present invention may be operated in a continuous fashion. Using equipment of the type similar to that illustrated in FIG. 3, supra, nitric acid containing 56 weight percent $HNO_3$, and phosphorus sludge containing 6.52 weight percent elemental phosphorus and 8.78 weight percent total phosphorus, were pumped into the 96 mm OD × 122 cm reactor via separate lines at mass flow-rates of 6.41 grams/minute and 13.31 grams/minute, respectively. A z-shaped overflow tube with the exit line leading to the product reservoir was located 10.5 cm above the bottom of the reactor. Since the internal diameter of the reactor was about 90 mm, the reaction volume was about 667 cubic centimeters, and since the specific gravity of the reaction solution was about 1.2 grams/cubic centimeter, the residence time within the reactor was about 40 minutes. Pure oxygen was added to the reactor at a rate of 600 mL/min. Water, 500 grams, was added to the scrubber. The reaction was continued for 3.63 hours at temperatures of 212°-215° F., during which period 1397 grams of nitric acid and 2901 grams of phosphorus sludge were fed through the reactor. Supplemental heat was periodically required to maintain the boiling point of the reaction mixture. About 45.7 grams of OA-5 foam retardant was added to control foaming. The resultant 4344 grams of reaction product was found to contain 200 ppm elemental phosphorus, 5.82 percent total phosphorus and 12.23 percent nitric acid. The 1,000 grams of combined scrubber solution and scrubber rinsewater contained 0.001 percent total phosphorus and 0.59 percent $HNO_3$.

EXAMPLE X

A composite nitric acid oxidation product, 884 grams prepared as in EXAMPLES I-III, was filtered to give 37.1 grams of solid residue and 847 grams of filtrate. Chemical analysis of the solid residue showed it to contain 1.3 percent total P, 0.4 percent N, 116 ppm Pb, 4 ppm Cd, 24 ppm Cr, and 25 ppm Ba. The 847 grams of filtrate contained 5.0 percent total P, 2.5 percent N, 185 ppm Pb, 12 ppm Cd, 9 ppm Cr, and 9 ppm Ba.

EXAMPLE XI

A composite sulfuric acid/nitric acid oxidation product, 854 grams prepared as in EXAMPLES V-VIII, was filtered to give 42 grams of solid residue and 812 grams of filtrate. Chemical analysis of the solid residue showed it to contain 1.8 percent total P, 8.8 percent S, 2420 ppm Pb, 26 ppm Cd, 14 ppm Cr, and 141 ppm Ba. The 812 grams of filtrate were found to contain 4.2 percent total P, 9.0 percent S, <1 ppm Pb, 8 ppm Cd, 12 ppm Cr, and <1 ppm Ba.

INVENTION PARAMETERS

After sifting and winnowing through the data presented in the examples, supra, as well as other data which we have assembled in making the present invention, we have determined the operating parameters of the present invention are as follows:

| Process Parameters | Operating Range | Preferred |
|---|---|---|
| Nitric acid conc., wt. % | 40-71 | 55-71 |

-continued

| Process Parameters | Operating Range | Preferred |
|---|---|---|
| Percentage excess HNO$_3$, % | 5-150 | 25-50 |
| Sulfuric acid conc., wt. % | 93-98 | 95-98 |
| Weight ratio, H$_2$SO$_4$:HNO$_3$ | 1-3 | 1.7-2.5 |
| P-sludge conc., wt. % P$_4$ | 2-20 | 5-11 |
| P-sludge conc., wt. % other solids | 2-10 | 5 |
| Reaction temperature, °F. | 212-260 | 212-240 |
| Reaction time, hours | 0.66-6 | 1.5-3 |

Having shown and described particular embodiments, we realize that those skilled in the art will conceive numerous improvements, modifications, and variations thereof which are, nevertheless, within the spirit and scope of our invention. We wish it understood, therefore, that the appended claims are intended to cover such improvements, modifications, and variations.

What we claim and desire to secure by Letters Patent of the United States is:

1. A process for converting aqueous elemental phosphorus-containing materials into orthophosphate containing intermediate products suitable for subsequent reaction with ammonia to produce nitrogen and phosphorus-containing fertilizer products, which process comprises the steps of:
   (a) introducing into reactor means predetermined quantities of nitric acid, sulfuric acid, and aqueous elemental phosphorus-containing residue, said aqueous elemental phosphorus-containing residue containing from about 2 to about 20 percent by weight elemental phosphorus; said nitric acid ranging from about 40 to about 70 weight percent concentration and of quantity to provide from about 5 to about 150 percent excess nitric acid relative to the stoichiometry of the chemical equation: $20HNO_3 + 3P_4 + 8H_2O \rightarrow 12H_3PO_4 + 20NO$; said sulfuric acid ranging from about 93 percent to about 98 percent by weight and of quantity, relative to the proportion of said nitric acid, to provide weight ratios, H$_2$SO$_4$:HNO$_3$ ranging from about 1 to about 3;
   (b) maintaining the temperature in said reactor means at about the boiling point of the material maintained therein, for a period of time sufficient to oxidize substantial amounts of the elemental phosphorus values thereof;
   (c) adding gaseous oxidizing media to said reactor means in quantity sufficient to convert substantial amounts of the nitric oxide formed in step (b), supra, to nitrogen dioxide;
   (d) removing from said reactor means said nitrogen dioxide and introducing same and water into scrubber means;
   (e) removing from said scrubber means in step (d), supra, the resulting dilute nitric acid; and
   (f) recovering from said reactor means as intermediate product the resulting oxidized liquid from step (b), supra;
said process being characterized by the fact that the elemental phosphorus content of the oxidized intermediate product in step (b), supra, is less than about 2 ppm and the orthophosphate portion of the total phosphorus content thereof is greater than about 90 percent.

2. The process of claim 1, wherein the weight ratio H$_2$SO$_4$:HNO$_3$ is maintained in the range of about 1 to 2.5, and wherein the weight percent concentration of said nitric acid is maintained in the range of about 50 to about 70 weight percent.

3. The process of claim 2, wherein said weight ratio H$_2$SO$_4$:HNO$_3$ is maintained in the range of about 1.5 to 2.5, and wherein the weight percent concentration of said nitric acid is maintained in the range of about 55 to about 70 weight percent.

4. The process of claim 3, wherein said weight ratio H$_2$SO$_4$:HNO$_3$ is maintained in the range of about 1.7 to about 2.5, wherein the weight percent concentration of said nitric acid is maintained in the range of about 55 to about 60 weight percent, and wherein the concentration of said sulfuric acid ranges from about 95 percent to about 98 percent weight percent.

5. The process of claim 4, wherein said weight ratio H$_2$SO$_4$:HNO$_3$ is maintained in the range of about 1.7 to about 2.0, wherein the weight percent concentration of said nitric acid is maintained in the range of about 56 to about 60 weight percent, and wherein the concentration of said sulfuric acid is about 96 weight percent.

6. The process of claim 1, wherein the liquid oxidized intermediate product in step (f) is introduced into separation means for removal of precipitated salts and solid residues and wherefore substantial fractions of metals selected from the group consisting of Pb, Cd, Cr, and Ba, or mixtures thereof are removed from the liquid product prior to conversion to fertilizer products.

7. The process of claim 1, wherein a foam retardant is added to control foaming in step (b) thereof.

8. The process of claim 1, wherein agitator means is utilized in said reactor means to affect mixing and to maintain suspension of solid particles in step (b) thereof.

9. The process of claim 8, wherein said agitator means is fitted with foam breaking means to thereby effect defoaming in said step (b).

10. The process of claim 1, wherein the resulting dilute nitric acid in step (e) thereof is subsequently reacted with ammonia to produce a nitrogen-containing liquid fertilizer thereof.

11. The process of claim 1, wherein the resulting intermediate product recovered in step (f) thereof is subsequently reacted with ammonia to produce liquid nitrogen- and phosphorus-containing fertilizer.

12. The process of claim 1, wherein step (a) thereof said quantities of nitric acid and sulfuric acid are introduced into said reactor means simultaneously and prior to said addition of said phosphorus-containing residue whereby the yield of autogenous heat of reaction available from the feedstock components is maximized to thereby facilitate the temperature considerations in step (b) thereof during the beginning portion of said period of time.

13. The process of claim 1, wherein said step (a) thereof said quantities of nitric acid and sulfuric acid are introduced into said reactor means prior to said addition of said phosphorus-containing residue and further wherein said nitric acid is introduced into said reactor means prior to said addition of said sulfuric acid, whereby the yield of autogenous heat of reaction available from the feedstock components is maximized to thereby facilitate the temperature considerations in step (b) thereof during the beginning portion of said period of time.

14. The process of claim 1, wherein step (a) thereof a portion of the quantity of said nitric acid comprising from about 5 to about 25 percent by weight thereof is diverted to a side stream for subsequent introduction into said reactor means during the later portion of said period of time for temperature maintenance in step (b) thereof whereby is maintained a relatively constant rate of autogenous heat of reaction throughout said period of time.

15. The process of claim 14, wherein step (a) thereof said quantity of nitric acid initially introduced into said reactor means and said quantity of sulfuric acid introduced into said reactor means is introduced thereinto simultaneously and prior to said addition of said phosphorus-containing residue.

16. The process of claim 14, wherein step (a) thereof said quantity of nitric acid initially introduced into said reactor means and said quantity of sulfuric acid introduced into said reactor means is introduced thereinto prior to said addition of said phosphorus-containing residue and further wherein said initial addition of nitric acid is introduced prior to said addition of said sulfuric acid.

* * * * *